(12) United States Patent
Childress et al.

(10) Patent No.: US 11,151,448 B2
(45) Date of Patent: Oct. 19, 2021

(54) LOCATION TAGGING FOR VISUAL DATA OF PLACES USING DEEP LEARNING

(71) Applicant: INTERNATIONAL BUSINESS MACHINES CORPORATION, Armonk, NY (US)

(72) Inventors: Rhonda L. Childress, Austin, TX (US); Justin D. Eyster, Selinsgrove, PA (US); Avery K. Rowe, Venice, CA (US); Priyanka Sarkar, Austin, TX (US); Christopher E. Whitridge, Gaithersburg, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/606,139

(22) Filed: May 26, 2017

(65) Prior Publication Data

US 2018/0341854 A1 Nov. 29, 2018

(51) Int. Cl.
*G06N 3/08* (2006.01)
*G06K 9/62* (2006.01)
*G06K 9/00* (2006.01)
*G06K 9/46* (2006.01)
*G06N 3/04* (2006.01)

(52) U.S. Cl.
CPC ............ *G06N 3/08* (2013.01); *G06K 9/00624* (2013.01); *G06K 9/4628* (2013.01); *G06K 9/6232* (2013.01); *G06K 9/6271* (2013.01); *G06N 3/0454* (2013.01)

(58) Field of Classification Search
CPC ............ G06N 3/02; G06N 3/08; G06N 3/082; G06N 3/084; G06N 3/088; G06K 9/6232
See application file for complete search history.

(56) References Cited

U.S. PATENT DOCUMENTS

| | | | |
|---|---|---|---|
| 6,928,230 B2 | 8/2005 | Squibbs | |
| 7,487,017 B1 | 2/2009 | Bell et al. | |
| 7,493,565 B2 | 2/2009 | Parupudi et al. | |
| 8,015,129 B2 | 9/2011 | Thiesson et al. | |
| 8,285,716 B1 | 10/2012 | Srinivasaiah | |
| 8,725,288 B2 | 5/2014 | Yeung et al. | |

(Continued)

OTHER PUBLICATIONS

Weyand et al., "PlaNet—Photo Geolocation with Convolutional Neural Networks", Feb. 17, 2016, <http://arxiv.org/abs/1602.05314>, p. 1-10.*

(Continued)

*Primary Examiner* — Vincent Rudolph
*Assistant Examiner* — Timothy Choi
(74) *Attorney, Agent, or Firm* — John Noh

(57) ABSTRACT

A method, computer system, and a computer program product for generating a location tag for a piece of visual data using deep learning is provided. The present invention may include receiving the piece of visual data. The present invention may also include analyzing the received piece of visual data using a neural network. The present invention may then include retrieving a location for the analyzed piece of visual data from the neural network. The present invention may further include generating a plurality of metadata for the retrieved location associated with the analyzed piece of visual data, wherein the generated plurality of metadata includes the location tag.

20 Claims, 6 Drawing Sheets

(56) References Cited

U.S. PATENT DOCUMENTS

| | | | |
|---|---|---|---|
| 8,843,936 | B2 | 9/2014 | Kenkre et al. |
| 2001/0015759 | A1 | 8/2001 | Squibbs |
| 2001/0022621 | A1 | 9/2001 | Squibbs |
| 2005/0104976 | A1* | 5/2005 | Currans ............ G06F 17/30265 348/231.5 |
| 2009/0044235 | A1* | 2/2009 | Davidson ............... G06Q 30/06 725/87 |
| 2009/0210388 | A1 | 8/2009 | Elson et al. |
| 2012/0310968 | A1* | 12/2012 | Tseng .................. G06F 16/5866 707/769 |
| 2013/0129142 | A1* | 5/2013 | Miranda-Steiner ......................... G06K 9/00664 382/103 |
| 2016/0379091 | A1* | 12/2016 | Lin .................... G06K 9/00724 382/156 |
| 2017/0109615 | A1 | 4/2017 | Yatziv et al. |
| 2017/0169313 | A1 | 6/2017 | Choi et al. |
| 2018/0192265 | A1* | 7/2018 | Zawada .................. G06N 3/08 |
| 2018/0336461 | A1* | 11/2018 | Seide .................... G06F 9/4881 |

OTHER PUBLICATIONS

Lee et al., "Deep Neural Network Self-training Based on Unsupervised Learning and Dropout", Mar. 2017, Int. Journal of Fuzzy Logic and Intelligent Systems, vol. 17, No. 1, p. 1-9.*

"Convolutional Neural Networks (CNN/ ConvNets)", Apr. 2016, <https://web.archive.org/web/20160426151931/http://cs231n.github.io/convolutional-networks/>, p. 1-22.*

Gopi et al., "Digital Image Forgery Detection Using Artificial Neural Network and Auto Regressive Coefficients", May 2006, IEEE, 2006 Canadian Conf. on Electrical and Computer Engineering, p. 194-197.*

Jacobs et al., "Geolocating Static Cameras", Oct. 2007, IEEE, 2007 IEEE 11th International Conference on Computer Vision, p. 1-6.*

Angelova et al., "Pruning Training Sets for Learning of Object Categories", Jun. 2005, IEEE, 2005 IEEE Computer Society Conference on Computer Vision and Pattern Recognition, p. 1-8. (Year: 2005).*

Salimans et al., "Improved Techniques for Training GANs", Dec. 2016, Currans Associates, Proc. of the 30th Int. Conf. on Neural Information Processing Systems, p. 2234-2242. (Year: 2016).*

Fu et al., "Tagging Personal Photos with Transfer Deep Learning", May 2015, IW3C2, Proceedings. of the 24th Int. Conf. on World Wide Web 2015, p. 344-354. (Year: 2015).*

Wu et al., "Learning to Tag", Apr. 2009, ACM, WWW'09: Proceedings of the 18th international conference on World wide web, p. 361-370. (Year: 2009).*

Workman et al. "Wide-Area Image Geolocalization with Aerial Reference Imagery", Oct. 13, 2015, arXiv.org, <https://arxiv.org/abs/1510.03743>, p. 1-10. (Year: 2015).*

Sunkavalli et al., "What do color changes reveal about an outdoor scene?", Jun. 28, 2008, IEEE, 2008 IEEE Conference on Computer Vision and Pattern Recognition, p. 1-8. (Year: 2008).*

ARXIV, "Google Unveils Neural Network with 'Superhuman' Ability to Determine the Location of Almost Any Image," MIT Technology Review, Feb. 24, 2016, p. 1-6, Emerging Technology from the arXiv Blog, https://www.technologyreview.com/s/600889/google-unveils-neural-network-with-superhuman-ability-to-determine-the-location-of-almost/, Accessed on Apr. 5, 2017.

Mell et al., "The NIST Definition of Cloud Computing," National Institute of Standards and Technology, Sep. 2011, p. 1-3, Special Publication 800-145.

IBM, "List of IBM Patents or Patent Applications Treated as Related (Appendix P)," May 16, 2018, p. 1-2.

Childress et al., "Location Tagging for Visual Data of Places Using Deep Learning," Application and Drawings, Filed on Sep. 19, 2017, 30 Pages, U.S. Appl. No. 15/708,786.

\* cited by examiner

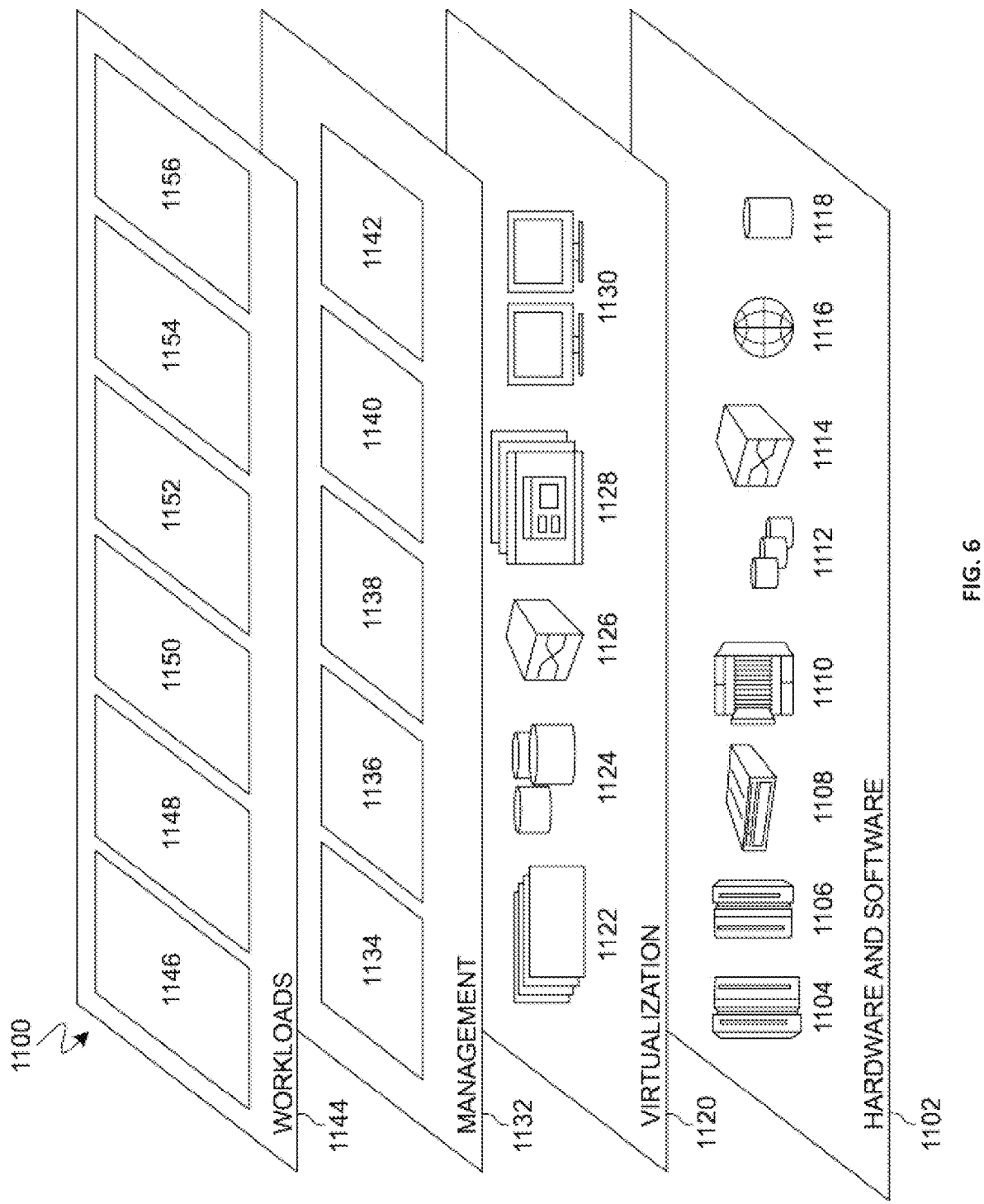

LOCATION TAGGING FOR VISUAL DATA OF PLACES USING DEEP LEARNING

BACKGROUND

The present invention relates generally to the field of computing, and more particularly to cognitive computing.

Corporate entities, today, generate a plethora of dark data, or unused data, to extract business insights, such as, images, digital audio files and digital recordings. Even though techniques in cognitive computing have evolved to extract useful information from dark data, limited development has occurred with the location tagging of visual data.

SUMMARY

Embodiments of the present invention disclose a method, computer system, and a computer program product for generating a location tag on visual data based on deep learning. The present invention may include receiving the piece of visual data. The present invention may also include analyzing the received piece of visual data using a neural network. The present invention may then include retrieving a location for the analyzed piece of visual from the neural network. The present invention may further include generating a plurality of metadata for the retrieved location associated with the analyzed piece of visual data, wherein the generated plurality of metadata includes the location tag.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 6 is a block diagram of functional layers of the illustrative cloud computing environment of FIG. 5, in accordance with an embodiment of the present disclosure.

DETAILED DESCRIPTION

Figure 1:
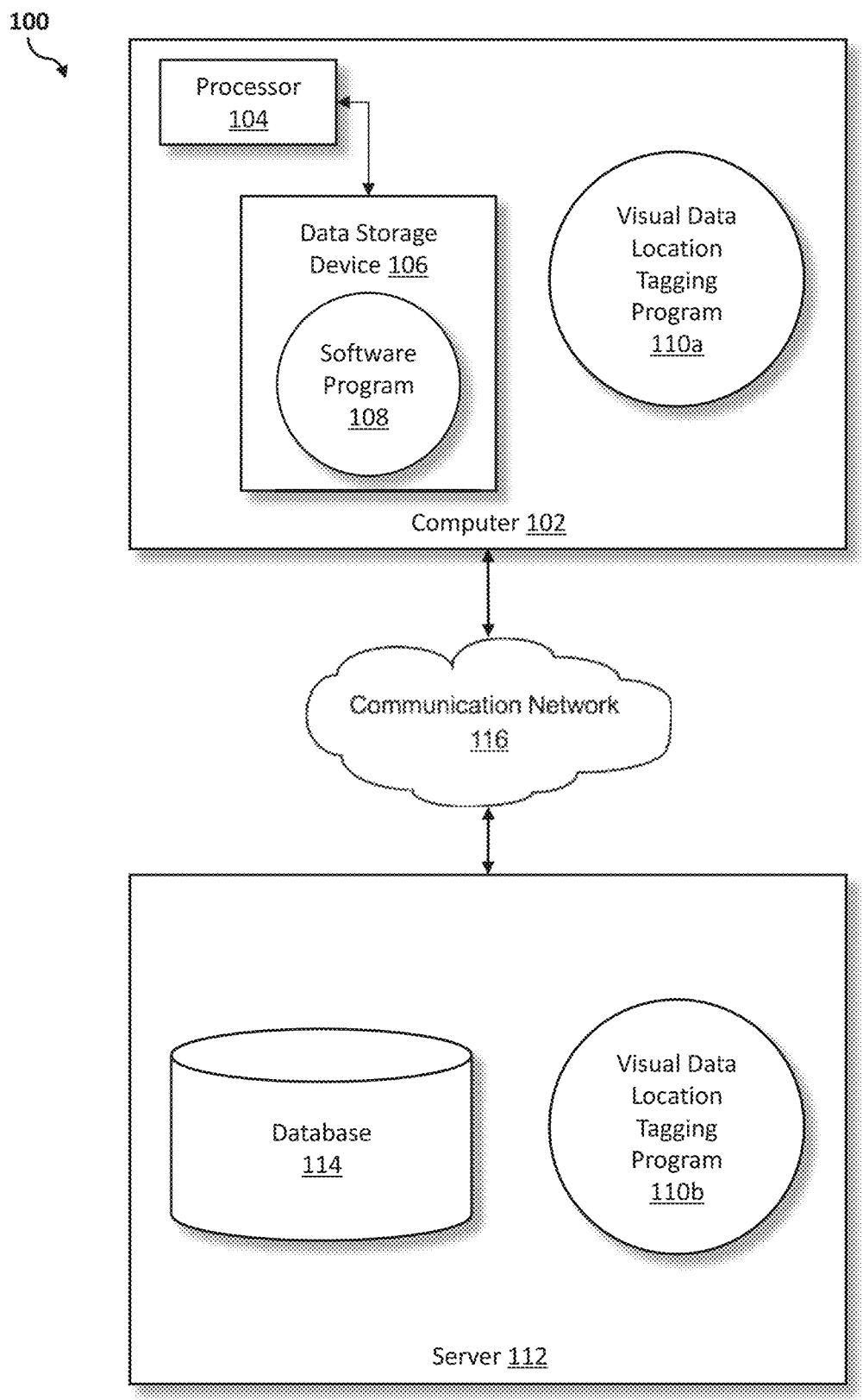
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for generating location tags on visual data based on deep learning. As such, the present embodiment has the capacity to improve the technical field of cognitive computing by using deep learning to obtain location metadata on visual data. More specifically, the visual data location tagging program enters the visual data into the neural network using deep learning as input. The neural network then uses deep learning to analyze the visual data and determine the location the visual data depicts. The visual data location tagging program, then, places location tags on the visual data to indicate where the visual data was taken. Any new data may be stored in the dataset of the neural network.

As described previously, corporate entities, today, generate a plethora of dark data, or unused data, to extract business insights, such as, images, digital audio files and digital recordings. Even though techniques in cognitive computing have evolved to extract useful information from dark data, limited development has occurred with the location tagging of visual data.

Therefore, it may be advantageous to, among other things, utilize deep learning to generate location metadata to assign location tags to visual data.

The present embodiment may include tagging visual data (i.e., photographs, images and pictures) with their location, rather than the user, using deep learning and the recognizable features of the visual data. Deep learning is a subfield of machine learning associated with known algorithms, inspired by the structure and function of the neural network in the animal visual cortex. Deep learning utilizes a neural network to classify or cluster image, text, or audio data. Algorithms may provide the ability for the neural network associated with the visual data location tagging program to learn how to recognize visual data for location tagging based on the vast quantities of data collected by the visual data location tagging program. According to at least one embodiment, the visual data location tagging program may also generate metadata, on a particular location, immediately after the visual data are obtained. The visual data location tagging program may utilize visual recognition through deep learning and apply the location tags to respective visual data.

According to at least one embodiment, the visual data location tagging program may enter visual data as input through a robust and trained neural network that may be continuously improved and updated with new labeled visual data. For each location, a vast quantity of the visual data may be gathered with variations in angles, zoom, color, image quality, resolution, and other photographic image factors. A known convolutional neural network, which is a type of feed-forward artificial neural network where the connectivity pattern between the nodes is based on the visual cortex, may be utilized for image recognition and classification. The neural network, in the case of classification, may undergo training on the set of labeled inputs to classify new inputs.

According to at least one embodiment, a large labeled dataset may be utilized to train the neural network to predict the names of locations in the visual data. The dataset may include visual data of locations tagged with corresponding names by extracting visual data from social media sites or tourism websites. Alternatively, a user may manually include a location tag with the visual data. The deep learning frameworks may provide basic models and known algorithms for training the neural network. Gathering more data and certain known algorithms (e.g., regularization, cross-validation) may be utilized to prevent the neural network from overfitting the training data. After the neural network is trained, the visual data location tagging program may be utilized to predict the location depicted within visual data. According to one embodiment, the neural network may be stored as a serialized model (i.e., binary file storing the state of the model), which may be accessed by the visual data location tagging program. Over time, the neural network may be updated to periodically gather more data to retrain the neural network.

According to at least one embodiment, when visual data is entered or uploaded into the visual data location tagging program, the visual data is entered into the neural network. The neural network, then, may tag the visual data with the location, if the location was previously added to the visual data location tagging program. Any additional visual data may be included into the dataset. Then, the latest trained neural network may be repeatedly trained on the newest data for a more robust and accurate neural network.

According to at least one embodiment, the neural network may also detect the location depicted within visual data. Each node within the neural network may be a part of a hierarchical structure. The first layer of nodes under the root node may include neural networks that identify large, general categories of locations (e.g., type of landscape or continents). Each node may branch into other nodes with more specific categories of the parent node (e.g., if the parent node was a tundra, then the child nodes may be neural networks that identify if the location is Russia, Canada or Northern Europe). The pattern may repeat from node to node, until the specific location of the visual data may be obtained by the neural network. The hierarchical structure in which each node may be contained within a series of neural networks may yield better performance and higher accuracy.

According to at least one embodiment, the visual data location tagging program may include a manual annotation option for a user to change the determined location retrieved by the neural network. Human intervention may be utilized to correct any erroneous location determinations. Such a manual annotation may be useful in the initial stages of training the neural network, until accurate and reliable location determination may be retrieved from the neural network.

The present embodiment may include additional information on weather, date and time of day. Additionally, the visual data location tagging program may include the capability to gather weather data. Information related to weather, date and time of day may be included within the metadata for each piece of visual data. Each tag location may be time and date-stamped. According to at least one embodiment, each piece of visual data may be validated for veracity. The additional information on weather, date and time of day may be included to confirm the location of the visual data, and genuineness of the visual data. If the additional information conflicts with the pre-determined location of visual data, then the visual data location tagging program may not generate a location metadata for the visual data.

According to at one least embodiment, each piece of visual data utilized for training the neural network associated with deep learning will be pre-validated for veracity to determine that the visual data from an authoritative source (i.e., visual data from credible tourism websites, and visual data from a trusted person who personally took the visual data or who was included in the visual data). Pre-validating each piece of visual data prevents any person from utilizing the visual data location tagging program to generate a location metadata for a photographic visual data with a digitally altered background. Such an altered photographic visual data may adversely affect the proper and accurate training of the neural network associated with deep learning.

The present embodiment may include integrating the visual data location tagging program into a previously existing software application associated with cameras, mobile phones and social media sites for collecting visual data. According to at least one other embodiment, the visual data location tagging program may be a separate program, not integrated into another software program, for collecting visual data.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a visual data location tagging program 110a. The networked computer environment 100 may also include a server 112 that is enabled to run a visual data location tagging program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the visual data location tagging program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the visual data location tagging program 110a, 110b (respectively) to generate location tags corresponding to visual data based on deep learning. The visual data location tagging method is explained in more detail below with respect to FIGS. 2 and 3.

Figure 2:
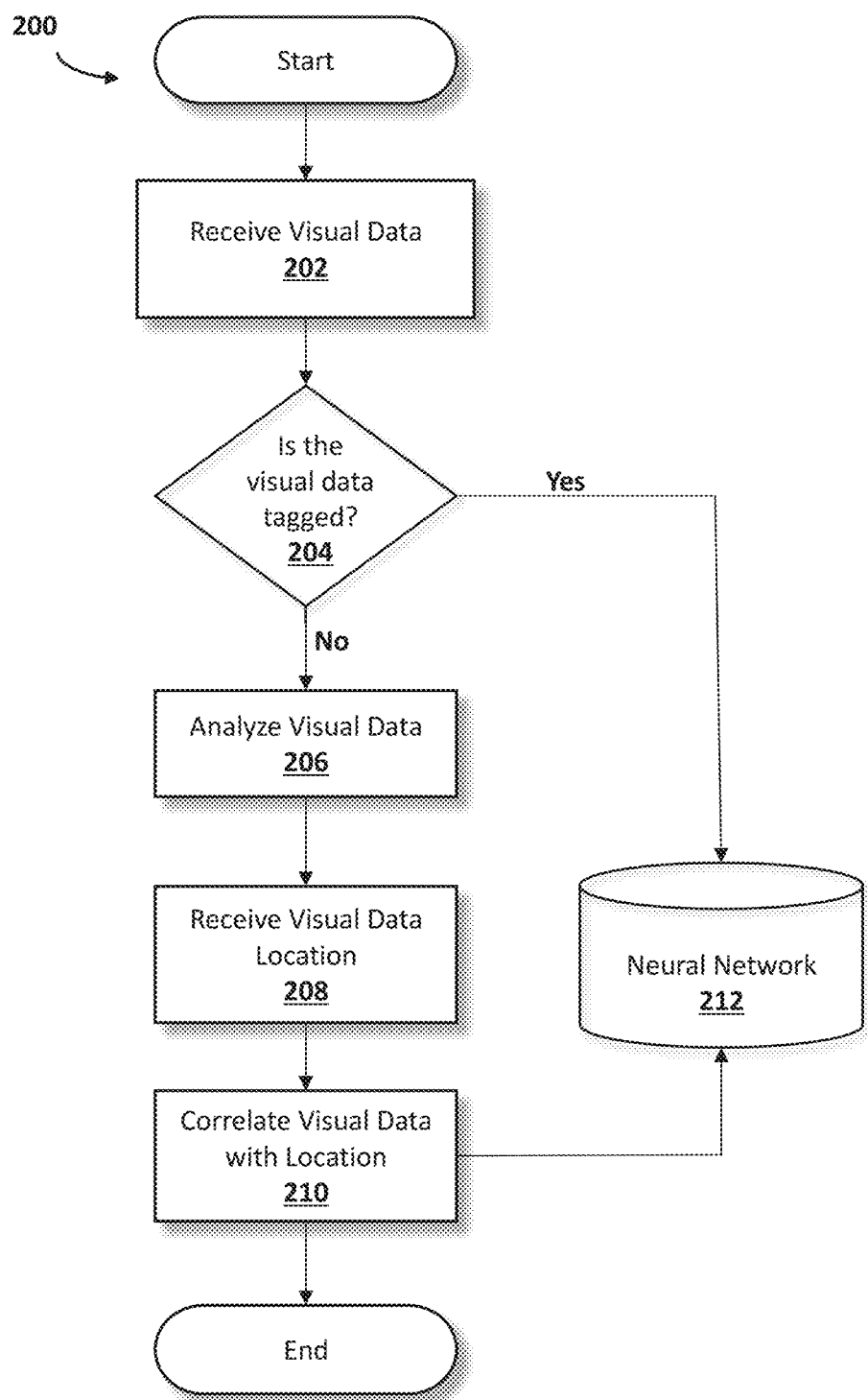
FIG. 2 is an operational flowchart illustrating a process for training the neural network according to at least one embodiment.

Referring now to FIG. 2, an operational flowchart illustrating the exemplary process for training the neural network 200 used by the visual data location tagging program 110a and 110b according to at least one embodiment is depicted.

At 202, at least one piece of visual data (i.e., training visual data) is received. Visual data may be utilized to train the neural network associated with deep learning. Visual data may include photographs, images or pictures, which may be entered into the neural network as input to determine the location depicted in the visual data. The visual data may be, for example, uploaded from digital cameras, mobile phones, social media sites and emails. Alternatively, the user may also manually input images, photographs or pictures into the visual data location tagging program 110a and 110b. Varying amounts of visual data may be entered into the visual data location tagging program 110a and 110b. For example, the user discovers a box of old family photographs, and decides to upload the photographs and store each photograph in digital files based on location. As such, the user manually inputs each of the photographs into the visual data location tagging program 110a and 110b.

Next, at 204, the visual data location tagging program 110a and 110b determines if the entered visual data includes a location tag. The entered visual data may include a location tag in which the location in the visual data may include metadata associated with the location in the visual data (i.e., visual data uploaded from social media sites or tourism websites), or untagged which the entered visual data may include no metadata connected to location in the visual data. The visual data location tagging program 110a and 110b prompts the user to indicate whether each piece of visual data is tagged or not. If the user indicates that the piece of visual data is untagged, then the entered visual data may be further analyzed and correlated with a location entered by the user. If, however, the user indicates that the piece of visual data is tagged, then the piece of visual data may be placed directly into the neural network 212. Continuing the previous example, the user may indicate that the visual data is untagged. Thereafter, the visual data location tagging program 110a and 110b may proceed to analyze the visual data, and later may request the location of the visual data from the user.

If the visual data location tagging program 110a and 110b determined that the visual data is untagged at 204, then, at 206, the visual data is analyzed by the neural network. The entered visual data may be analyzed to determine the location of the visual data and to classify the visual data (i.e., image data). The neural network may include discrete layers of nodes, which may be utilized to analyze the visual data and determine the location where the visual data was taken. Each node within the neural network may be a part of a hierarchical structure, which may include parent and child nodes that process different aspects of the visual data. The neural network, which includes each node, is based on known algorithms that analyze the visual data, find features within the visual data, and compare these features with known features to determine the location depicted in each piece of visual data entered into the visual data location tagging program 110a and 110b. The first layer of nodes under the root node may include neural networks that may identify large, general categories of locations. Each node may branch into other nodes with more specific categories of the parent node. The pattern may repeat from node to node, until the specific location of the visual data may be obtained by the neural network. The hierarchical structure in which each node may be included may be within a series of neural networks.

Continuing the previous example, each of the photographs are analyzed by the neural network to determine the location of each of the photographs entered by the user. In one of the photographs, the first layer of nodes under the root node within the neural network (i.e., parent nodes) identifies a desert as the background landscape of the photograph. Since the parent node determines that the photograph was taken in a desert, each child node may branch into other nodes with more specific categories of the parent node. Therefore, the child nodes reduce the possible locations to the Middle East, Southwestern United States, sub-Sahara or Southern Africa, Northern China or Mongolia, and Central Australia. The next layer of nodes identifies specific landmarks or distinguishing details in the photograph. In the photograph, the node identifies various flora, such as Kangaroo Paws, Blaze Cassia and Stuart's Desert Pea, and the landmark Uluru, also known as Ayer's Rock.

Then, at 208, the location of the visual data is received from the user. Human intervention may be utilized to manually input the location of the visual data. Human intervention by entering the location in which the visual data was taken may be useful in the initial stages of training of the neural network, until accuracy and reliability may be accomplished without human intervention. After the analysis of the visual data is completed, the visual data location tagging program 110a and 110b may prompt the user with a dialog box to enter the location depicted on the visual data. Under the location box in the dialog box, there may be a "Submit" button. After the user enters the location, the user may, then, click the "Submit" button. Then, the dialog box may disappear.

Continuing the previous example, the visual data location tagging program 110a and 110b presents each photograph individually to the user. The user is prompted by a dialog box next to the individual photograph to manually input the location that the uploaded photograph was taken. The user remembers that the uploaded photograph was taken during a family trip to Australia. In the photograph, the user's family was located Alice Springs Desert Park, which is in the Northern Territory of Australia. Therefore, the user enters "Alice Springs Desert Park, Northern Territory of Australia" in the location box and clicks the "Submit" button under the location box in the dialog box. Then, the dialog box for that photograph disappears.

Then, at 210, the visual data is correlated with the location entered by the user, and the correlated visual data and location are stored in a dataset within the neural network 212. The neural network process 200 may correlate the visual data and the location based on known algorithms. Therefore, if a user entered visual data with the same or similar location, then the neural network process 200 may correlate the visual data on the entered photograph or picture with the previously determined location to tag the location of the visual data. Then, the determined location with the corresponding visual data may be stored in the dataset of the neural network 212. The neural network 212 may improve and recognize more visual data locations with each interaction of different visual data. Continuing the previous example, after the analysis of the visual data and the manual input of the user, the visual data location tagging program 110a and 110b correlates the photograph to Alice Springs Desert Park located in the Northern Territory of Australia, and further determines that flora, Kangaroo Paws, Blaze Cassia and Stuart's Desert Pea, as well as the landmark Uluru (i.e., Ayer's Rock), are indicative of the Alice Springs Desert Park located in the Northern Territory of Australia. This data is then stored in the dataset for the neural network 212. Therefore, if the user uploads or enters another photograph with the same flora, landmark or background, the visual data location tagging program 110a and 110b may be able to determine the location of the photograph.

If the visual data location tagging program 110a and 110b determines that the entered visual data at 202 includes a location tag, then the entered visual data is sent directly to the neural network 212. Visual data that includes metadata indicating the location in which the visual data was taken may not require further analysis and correlation with the location. As such, the tagged visual data may be placed as input directly into the dataset of the neural network 212. Continuing the previous example, if the user uploaded photographs from social media sites, then these uploaded photographs may already include a location tag and may be sent directly to the neural network for storage.

In another embodiment, the training of the neural network process 200 may include the neural network 212 improving over time based on visual data gathered by the visual data location tagging program 110a and 110b. As more visual data is entered as input into the visual data location tagging program 110a and 110b, the visual data location tagging program 110a and 110b may de-serialize (i.e., extract a data structure from a series of bytes) the neural network 212 to pass the new visual data into the neural network 212, programmatically. Then, the latest trained neural network 212 may be trained based on the newest visual data included in the dataset. Therefore, the visual data location tagging program 110a and 110b may be able to improve image recognition and classification due to a more robust and accurate neural network 212.

Figure 3:
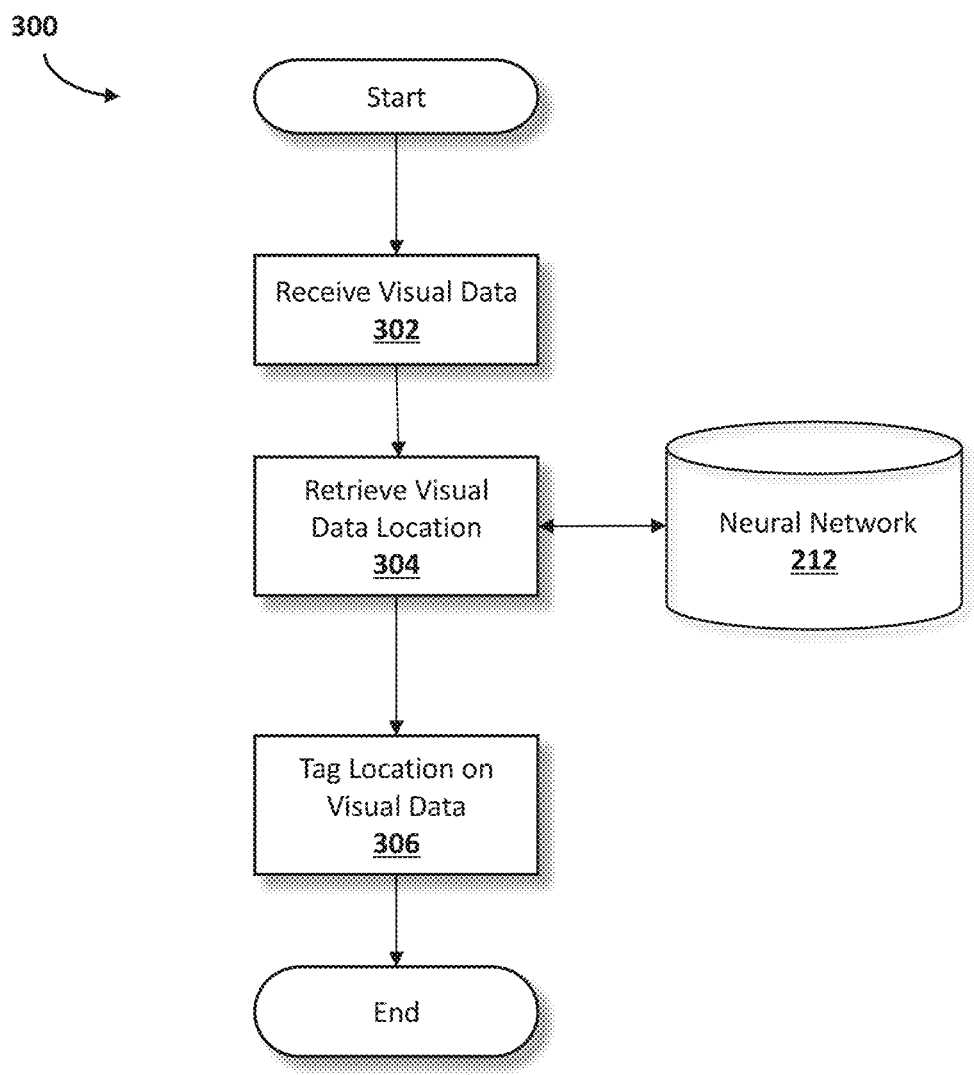
FIG. 3 is an operational flowchart illustrating a process for generating location tags on visual data according to at least one embodiment.

Referring now to FIG. 3, an operational flowchart illustrating the exemplary process for generating the location tag on visual data using deep learning 300 used by the visual data location tagging program 110a and 110b according to at least one embodiment is depicted.

At 302, visual data is received by the visual data location tagging program 110a and 110b. Using a software program 108 on the user's device (e.g., user's computer 102), untagged visual data may be received as input into the visual data location tagging program 110a and 110b. The untagged visual data may include images, photographs or pictures uploaded from digital cameras, mobile phones, social media websites and emails, and alternatively, images, pictures and photographs manually entered by the user. For example, an insurance company representative receives an email from an insured client describing the circumstances surrounding an automobile accident involving the insured client. Attached to the email, the insured client includes a photograph of the insured client's damaged vehicle at the scene of the accident. The insurance company representative will verify that the accident occurred in the same location alleged by the insured client. Therefore, the insurance company representative uploads the photograph of the damaged vehicle at the accident scene into the visual data location tagging program 110a and 110b.

Next, at 304, the determined visual data location is retrieved from the neural network 212. Using the untagged visual data input from 302, the neural network 212 may determine the location of the untagged visual data. The untagged visual data may be utilized by the visual data location tagging program 110a and 110b to search the dataset in the neural network 212 for the location that corresponds to the entered untagged visual data. Thereafter, the location corresponding with the specific visual data may be retrieved as output from the neural network 212. Continuing the previous example, the visual data location tagging program 110a and 110b searches the dataset in the neural network 212 for the specific location that the photograph of the damaged car was taken. The visual data location tagging program 110a and 110b retrieves "the intersection of Grove Street and Bell Blvd in Queens, N.Y. approximately 0.5 miles from Northern Blvd" as the location that the photograph of the damaged car was taken.

Then, at 306, the visual data is tagged with the determined location. The visual data location tagging program 110a and 110b may assign a location tag to the visual data. Tagging visual data of places with data indicating location, or the process of adding geographical information to various media in the form of metadata, is a known process. The location data may include addresses, street intersections, distance and place names. Therefore, the visual data may include specific information about the location depicted by the visual data. Continuing the previous example, the photograph is automatically assigned a location tag with the determined location, "the intersection of Grove Street and Bell Blvd in Queens, N.Y. approximately 0.5 miles from Northern Blvd." The insurance company representative obtains the location of the photograph, and verifies the location of the accident based on the assigned location tag and the explanation of the accident within the email provided by the insured client.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
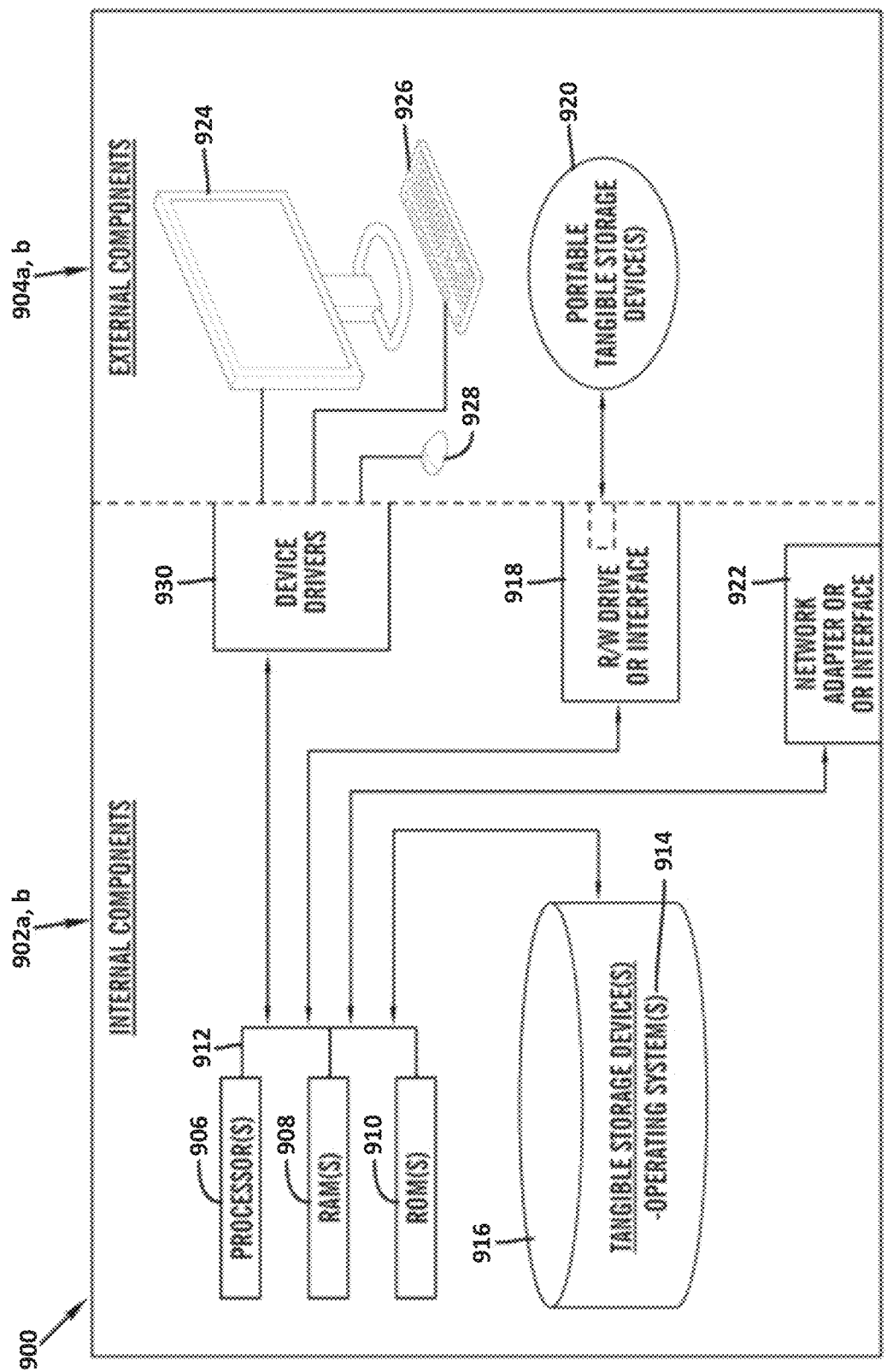
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the visual data location tagging program 110a in client computer 102, and the visual data location tagging program 110b in network server 112, may be stored on one or more computer-readable tangible storage devices 916 for execution by one or more processors 906 via one or more RAMs 908 (which typically include cache memory).

In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the visual data location tagging program 110a and 110b can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the visual data location tagging program 110a in client computer 102 and the visual data location tagging program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the visual data location tagging program 110a in client computer 102 and the visual data location tagging program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
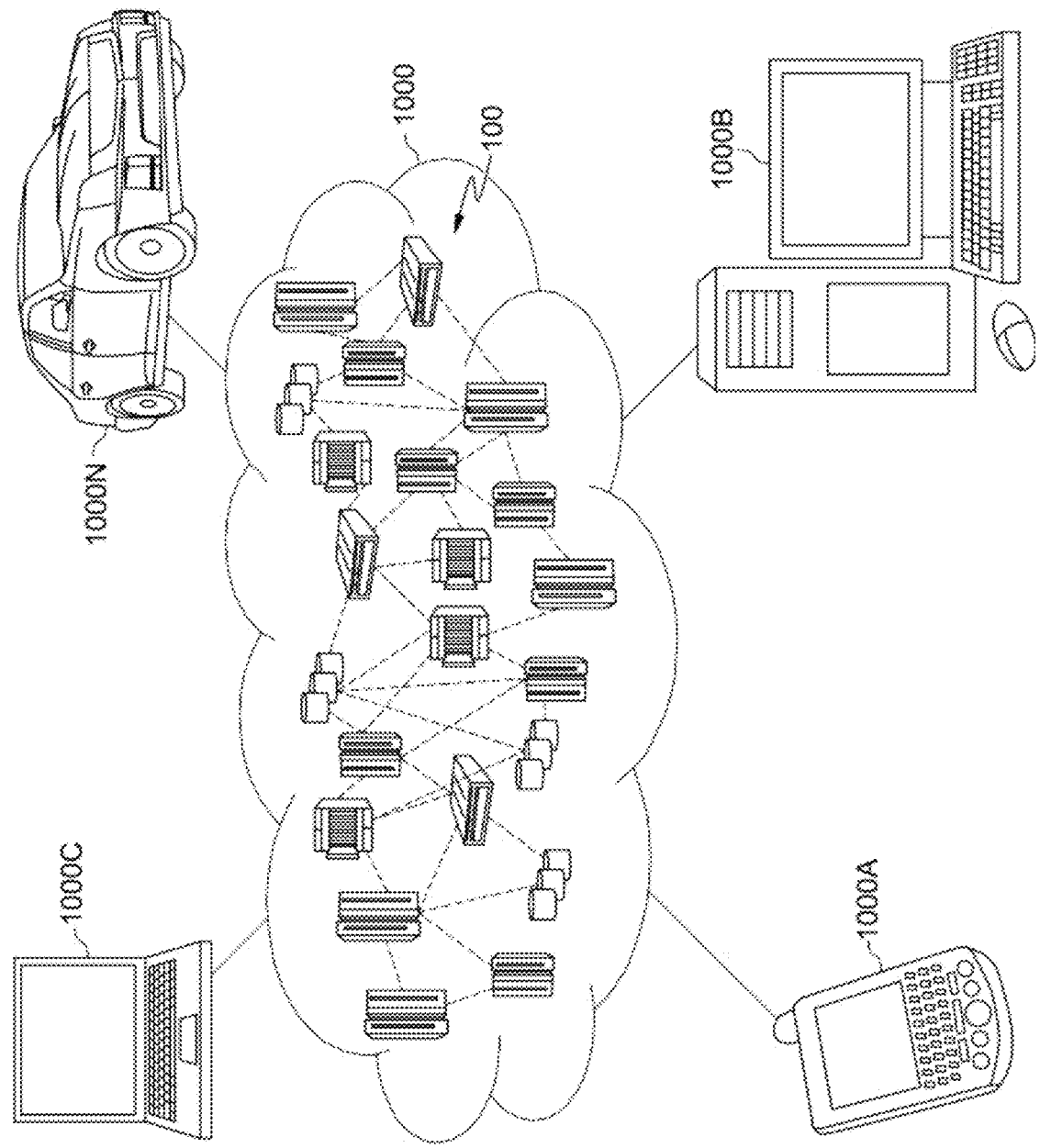
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and visual data location tagging of places with their location 1156. A visual data location tagging program 110a, 110b provides a way to generate location tags for visual data using deep learning.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a location tag for a piece of visual data using deep learning, the method comprising:

receiving the piece of visual data, wherein each received piece of visual data is validated for veracity;

determining, by a user, whether the received piece of visual data includes a location tag;

as a result of the received piece of visual data failing to include a location tag, analyzing the received piece of visual data using a neural network, wherein the neural network is built by receiving a plurality of training visual data, wherein a piece of digitally altered visual data is identified, wherein the identified piece of digitally altered visual data is removed from the received plurality of training visual data, wherein the neural network is de-serialized to pass an increased amount of new piece of visual data into the neural network programmatically, wherein the training visual data comprises a plurality of prior visual data, each prior visual data including a respective prior location tag as a result of a respective computer determined location tag being correlated with a respective manually entered location tag, the respective prior location tag including a time stamp and a date stamp, the respective prior location tag further including information related to weather;

retrieving a location for the analyzed piece of visual data from the neural network, wherein, based on the respective prior location tag, computer generated data associated with weather included in the information related to weather, computer generated data associated with time of day included in the time stamp and computer generated data associated with date included in the date stamp is utilized to confirm a genuineness of the analyzed piece of visual data, wherein the genuineness of the analyzed piece of visual data includes a determination on the accuracy of the retrieved location associated with the analyzed piece of visual data, wherein in response to a determination that the retrieved location fails to correspond with the retrieved plurality of training visual data and the analyzed piece of visual data lacks genuineness, failing to generate a plurality of metadata fora location for the analyzed piece of visual data; and generating the plurality of meta data for the retrieved location associated with the analyzed piece of visual data, wherein the generated plurality of metadata includes the location tag.

2. The method of claim 1, further comprising:
receiving the plurality of training visual data;
determining that the received plurality of training visual data includes a plurality of corresponding location metadata; and
storing, in a dataset within the neural network, the received plurality of training visual data with the plurality of corresponding location metadata.

3. The method of claim 1, further comprising:
receiving the plurality of training visual data;
determining that the received plurality of training visual data excludes a plurality of corresponding location metadata;
analyzing the received plurality of training visual data using the neural network;
receiving a plurality of locations corresponding with the received plurality of training visual data;
associating the received plurality of locations with the received piece of training visual data; and
storing, in a dataset within the neural network, the received plurality of locations with the associated received plurality of training visual data.

4. The method of claim 3, wherein analyzing the received plurality of training visual data, further comprises:
analyzing the received plurality of training visual data using a plurality of nodes from the neural network;
determining a plurality of image data based on the analyzed plurality of training visual data; and
storing, in the dataset within the neural network, the determined plurality of image data.

5. The method of claim 4, further comprising:
associating the determined plurality of image data with the retrieved plurality of locations corresponding with the received piece of visual data; and
storing, in the dataset within the neural network, the determined plurality of image data with the corresponding retrieved plurality of locations for the received plurality of visual data.

6. The method of claim 1, wherein retrieving the location for the analyzed piece of visual data from the neural network, further comprises:
searching a dataset within the neural network for a corresponding location to the analyzed piece of visual data; and
retrieving, from the dataset within the neural network, the corresponding location for the analyzed piece of visual data.

7. The method of claim 6, further comprising:
presenting the retrieved corresponding location for the received piece of visual data to a user;
receiving a revised location for the received piece of visual data;

storing, in the dataset within the neural network, the revised location corresponding with the received piece of visual data; and generating a revised plurality of metadata based on the revised location associated with the received piece of visual data.

8. A computer system for generating a location tag for a piece of visual data using deep learning, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving the piece of visual data, wherein each received piece of visual data is validated for veracity;
determining, by a user, whether the received piece of visual data includes a location tag;
as a result of the received piece of visual data failing to include a location tag, analyzing the received piece of visual data using a neural network, wherein the neural network is built by receiving a plurality of training visual data, wherein a piece of digitally altered visual data is identified, wherein the identified piece of digitally altered visual data is removed from the received plurality of training visual data, wherein the neural network is de-serialized to pass an increased amount of new piece of visual data into the neural network programmatically, wherein the training visual data comprises a plurality of prior visual data, each prior visual data including a respective prior location tag as a result of a respective computer determined location tag being correlated with a respective manually entered location tag, the respective prior location tag including a time stamp and a date stamp, the respective prior location tag further including information related to weather;
retrieving a location for the analyzed piece of visual data from the neural network, wherein, based on the respective prior location tag, computer generated data associated with weather included in the information related to weather, computer generated data associated with time of day included in the time stamp and computer generated data associated with date included in the date stamp is utilized to confirm a genuineness of the analyzed piece of visual data, wherein the genuineness of the analyzed piece of visual data includes a determination on the accuracy of the retrieved location associated with the analyzed piece of visual data, wherein in response to a determination that the retrieved location fails to correspond with the retrieved plurality of training visual data and the analyzed piece of visual data lacks genuineness, failing to generate a plurality of metadata fora location for the analyzed piece of visual data; and generating the plurality of meta data for the retrieved location associated with the analyzed piece of visual data, wherein the generated plurality of metadata includes the location tag.

9. The computer system of claim 8, further comprising:
receiving the plurality of training visual data;
determining that the received plurality of training visual data includes a plurality of corresponding location metadata; and storing, in a dataset within the neural network, the received plurality of training visual data with the plurality of corresponding location metadata.

10. The computer system of claim 8, further comprising:
receiving the plurality of training visual data;
determining that the received plurality of training visual data excludes a plurality of corresponding location metadata;
analyzing the received plurality of training visual data using the neural network;
receiving a plurality of locations corresponding with the received plurality of training visual data;
associating the received plurality of locations with the received piece of training visual data; and
storing, in a dataset within the neural network, the received plurality of locations with the associated received plurality of training visual data.

11. The computer system of claim 10, wherein analyzing the received plurality of training visual data, further comprises:
analyzing the received plurality of training visual data using a plurality of nodes from the neural network;
determining a plurality of image data based on the analyzed plurality of training visual data; and
storing, in the dataset within the neural network, the determined plurality of image data.

12. The computer system of claim 11, further comprising:
associating the determined plurality of image data with the retrieved plurality of locations corresponding with the received plurality of visual data; and
storing, in the dataset within the neural network, the determined plurality of image data with the corresponding retrieved plurality of locations for the received plurality of visual data.

13. The computer system of claim 8, wherein retrieving the location for the analyzed piece of visual data from the neural network, further comprises:
searching a dataset within the neural network for a corresponding location to the analyzed piece of visual data; and
retrieving, from the dataset within the neural network, the corresponding location for the analyzed piece of visual data.

14. The computer system of claim 13, further comprising:
presenting the retrieved corresponding location for the received piece of visual data to a user;
receiving a revised location for the received piece of visual data;
storing, in the dataset within the neural network, the revised location corresponding with the received piece of visual data; and
generating a revised plurality of metadata based on the revised location associated with the received piece of visual data.

15. A computer program product for generating a location tag for a piece of visual data using deep learning, comprising:
one or more computer-readable storage medium and program instructions stored on at least one of the one or more tangible storage medium, the program instructions executable by a processor, the program instructions comprising:
program instructions to receive the piece of visual data, wherein each received piece of visual data is validated for veracity;
program instructions to determine, by a user, whether the received piece of visual data includes a location tag;
program instructions as a result of the received piece of visual data failing to include a location tag, analyzing the received piece of visual data using neural network, wherein the neural network is built by receiving a plurality of training visual data, wherein a piece of digitally altered visual data is identified, wherein the identified piece of digitally altered visual data is removed from the received plurality of training visual data, wherein the neural network is de-serialized to pass an increased amount of new piece of visual data into the neural network programmatically, wherein the training visual data comprises a plurality of prior visual data, each prior visual data including a respective prior location tag as a result of respective computer determined location tag being correlated with a respective manually entered location tag, the respective prior location tag including a time stamp and a date stamp, the respective prior location tag further including information related to weather;
program instructions to retrieve a location for the analyzed piece of visual data from the neural network, wherein, based on the respective prior location tag, computer generated data associated with weather included in the information related to weather, computer generated data associated with time of day included in the time stamp and computer generated data associated with date included in the date stamp is utilized to confirm a genuineness of the analyzed piece of visual data, wherein the genuineness of the analyzed piece of visual data includes a determination on the accuracy of the retrieved location associated with the analyzed piece of visual data, wherein in response to a determination that the retrieved location fails to correspond with the retrieved plurality of training visual data and the analyzed piece of visual data lacks genuineness, failing to generate a plurality of metadata for a location for the analyzed piece of visual data; and
program instructions to generate the plurality of metadata for the retrieved location associated with the analyzed piece of visual data, wherein the generated plurality of metadata includes the location tag.

16. The computer program product of claim 15, further comprising:
program instructions to receive the plurality of training visual data;
program instructions to determine that the received plurality of training visual data includes a plurality of corresponding location metadata; and
program instructions to store, in a dataset within the neural network, the received plurality of training visual data with the plurality of corresponding location metadata.

17. The computer program product of claim 15, further comprising:
program instructions to receive the plurality of training visual data;
program instructions to determine that the received plurality of training visual data excludes a plurality of corresponding location metadata;
program instructions to analyze the received plurality of training visual data using the neural network;
program instructions to receive a plurality of locations corresponding with the received plurality of training visual data;
program instructions to associate the received plurality of locations with the received piece of training visual data; and program instructions to store, in a dataset within the neural network, the received plurality of locations with the associated received plurality of training visual data.

18. The computer program product of claim 17, wherein program instructions to analyze the received plurality of training visual data, further comprises:
- program instructions to analyze the received plurality of training visual data using a plurality of nodes from the neural network;
- program instructions to determine a plurality of image data based on the analyzed plurality of training visual data; and
- program instructions to store, in the dataset within the neural network, the determined plurality of image data.

19. The computer program product of claim 18, further comprising:
- program instructions to associate the determined plurality of image data with the retrieved plurality of locations corresponding with the received plurality of visual data; and
- program instructions to store, in the dataset within the neural network, the determined plurality of image data with the corresponding retrieved plurality of locations for the received plurality of visual data.

20. The computer program product of claim 15, wherein program instructions to retrieve the location for the analyzed piece of visual data from the neural network, further comprises:
- program instructions to search a dataset within the neural network for a corresponding location to the analyzed piece of visual data; and
- program instructions to retrieve, from the dataset within the neural network, the corresponding location for the analyzed piece of visual data.

* * * * *